(12) United States Patent
Hojo et al.

(10) Patent No.: US 9,147,866 B2
(45) Date of Patent: Sep. 29, 2015

(54) ELECTRONIC DEVICE

(71) Applicants: Kazuma Hojo, Nagoya (JP); Masashi Tanizaki, Nagoya (JP); Shinji Kobayashi, Nagoya (JP)

(72) Inventors: Kazuma Hojo, Nagoya (JP); Masashi Tanizaki, Nagoya (JP); Shinji Kobayashi, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/225,825

(22) Filed: Mar. 26, 2014

(65) Prior Publication Data

US 2014/0292988 A1    Oct. 2, 2014

(30) Foreign Application Priority Data

Mar. 27, 2013    (JP) ................. 2013-066346

(51) Int. Cl.
*B41J 29/13*    (2006.01)
*H01M 2/10*    (2006.01)
*H01M 6/06*    (2006.01)
*H04M 1/02*    (2006.01)

(52) U.S. Cl.
CPC .............. *H01M 2/1055* (2013.01); *H01M 6/06* (2013.01); *H04M 1/0262* (2013.01)

(58) Field of Classification Search
CPC ............................... H01R 11/281; H01R 13/24
USPC .................................... 347/10, 108; 439/500
See application file for complete search history.

(56) References Cited

U.S. PATENT DOCUMENTS

| 7,048,574 | B2 | 5/2006 | Shinohara et al. | |
|---|---|---|---|---|
| 2009/0247004 | A1* | 10/2009 | Lou | 439/500 |
| 2010/0302334 | A1* | 12/2010 | Inaba et al. | 347/109 |
| 2011/0086523 | A1* | 4/2011 | Yang et al. | 439/83 |
| 2013/0169728 | A1* | 7/2013 | Tanizaki et al. | 347/192 |

FOREIGN PATENT DOCUMENTS

| JP | 2003151519 | 5/2003 |
|---|---|---|
| JP | 2005026211 | 1/2005 |
| JP | 2009021206 | 1/2009 |

* cited by examiner

*Primary Examiner* — Julian Huffman
*Assistant Examiner* — Sharon A Polk
(74) *Attorney, Agent, or Firm* — McCarter & English, LLP (57) ABSTRACT

The disclosure discloses an electronic device comprising a battery container, a side wall, and a plate spring member. The side wall is disposed upright along a direction orthogonal to an axis of the dry battery. The plate spring member elastically urges the dry battery contained in the battery container. The plate spring member comprises a base portion, a contact portion, and a connection portion. The contact portion is in contact with a positive electrode or a negative electrode of the dry battery. The connection portion connects said base portion and said contact portion while bending. The connection portion comprises a first bent portion and a second bent portion. The first bent portion that is bent so as to connect said base portion and said contact portion in an inverted V-shape. The second bent portion comprises a projecting portion configured to project to the dry battery side.

5 Claims, 11 Drawing Sheets

COMPARATIVE EXAMPLE 2

ELECTRONIC DEVICE

CROSS-REFERENCE TO RELATED APPLICATION

The present application claims priority from Japanese Patent Application No. 2013-066346, which was filed on Mar. 27, 2013, the disclosure of which is incorporated herein by reference in its entirety.

BACKGROUND

1. Field

The present disclosure relates to an electronic device driven by power supplied from a dry battery.

2. Description of the Related Art

An electronic device driven by electric power supplied from a dry battery is known. In this electronic device, one end portion of a coil spring is fixed to a wall surface on one end side of a battery container (battery container case), and the other end portion of the coil spring urges the battery toward the other side. The one end portion of the coil spring is connected to a lead wire by a solder.

In the above described prior art, since the coil spring is used as a battery terminal, the terminal becomes longer, and a contact resistance becomes larger. Thus, there is a problem that only a voltage lower than the battery's original voltage is supplied.

In order to reduce the contact resistance, use of a plate spring having a terminal length smaller than the coil spring as a battery terminal can be considered. However, in this case, if an impact or an excessive force is received from a dry battery side such as a fall of the electronic device in a state in which the battery is attached to the battery container, for example, it is likely that the plate spring is largely displaced, and plastic deformation occurs. If such plastic deformation occurs, the plate spring might not be brought into contact with an electrode of the battery or electrical contact resistance might increase due to lowering of a contact pressure.

SUMMARY

The present disclosure has an object to provide an electronic device which can suppress plastic deformation of a plate spring while avoiding an increase in the contact resistance by using a plate spring for a battery terminal.

In order to achieve the above-described object, according to the aspect of the present application, there is provided an electronic device comprising a battery container configured to contain a dry battery that supplies electric power a side wall provided in the battery container and configured to be disposed upright along a direction orthogonal to an axis of the dry battery while facing a positive electrode or a negative electrode of the dry battery, and a plate spring member disposed on the side wall and configured to elastically urge the dry battery contained in the battery container the plate spring member comprising a base portion mounted on the side wall, a contact portion configured to be in contact with the positive electrode or the negative electrode of the dry battery contained in the battery container, and a connection portion that connects the base portion and the contact portion while bending, the connection portion comprising a first bent portion that is bent so as to connect the base portion and the contact portion in an inverted V-shape in a state in which the dry battery is contained in the battery container, and a second bent portion that is disposed on the base portion side than the first bent portion and comprises a projecting portion configured to project to the dry battery side in a state in which the dry battery is contained in the battery container.

The electronic device of the present disclosure is supplied with electric power by a dry battery contained in the battery container. A plate spring member is disposed on a side wall of the battery container. The plate spring member includes a base portion to be attached to the side wall, a contact portion to be brought into contact with a positive electrode or a negative electrode of the dry battery contained as above, and a connection portion which connects the base portion and the contact portion while bending. If the dry battery is contained in the battery container, the contact portion of the plate spring member is brought into contact with the positive electrode or the negative electrode of the dry battery. As a result, the plate spring member elastically urges the positive electrode or the negative electrode of the dry battery, and electrical conduction is realized from the dry battery to the plate spring member. As described above, by urging the contained dry battery by the plate spring, it is possible to avoid increase in the contact resistance (electrical conduction resistance) as in the case of using the coil spring.

However, if the plate spring is used, there is a concern that plastic deformation might occur (unlike the above described coil spring), in the case of large displacement as the result of receiving an impact or an excessive force for some reason from the dry battery side (if an urging force by the plate spring is weakened by this plastic deformation, electrical contact resistance increases). Thus, in the present disclosure, a configuration for suppressing occurrence of the above described plastic deformation is disposed on the plate spring. That is, on the above described connection portion of the plate spring member, two bent portions, that is, a first bent portion and a second bent portion disposed closer to the above described base portion side than this first bent portion are included.

If the plate spring member is to be displaced largely toward a side opposite to the battery due to occurrence of an impact or the like as above, stress applied by the above described impact in the course of the displacement is borne by the two bent portions in a distributed manner. As a result, the stress applied to one of the bent portions can be reduced, and plastic deformation can be suppressed.

Moreover, at this time, the first bent portion is bent toward one side so that the contact portion faces the positive electrode or the negative electrode of the dry battery in a state in which the dry battery is contained. On the other hand, the second bent portion is bent to the other side opposite to the above described first bent portion. Since bending directions of the two bent portions are opposite to each other as described above, displacement of the entire plate spring member including the two bent portions can be suppressed, whereby occurrence of plastic deformation on the plate spring member can be suppressed.

As a result of the above, in the present disclosure, by using the plate spring for the battery terminal, it is possible to suppress plastic deformation of the plate spring while avoiding increase in the contact resistance.

DETAILED DESCRIPTION OF THE PREFERRED EMBODIMENTS

An embodiment of the present disclosure will be described below by referring to the attached drawings. In the following explanation, terms "front", "rear", "left", "right", "upper", and "lower" refer to directions indicated in FIGS. 1 to 5.

<Entire Configuration of Print Label Producing Device>

Figure 1:
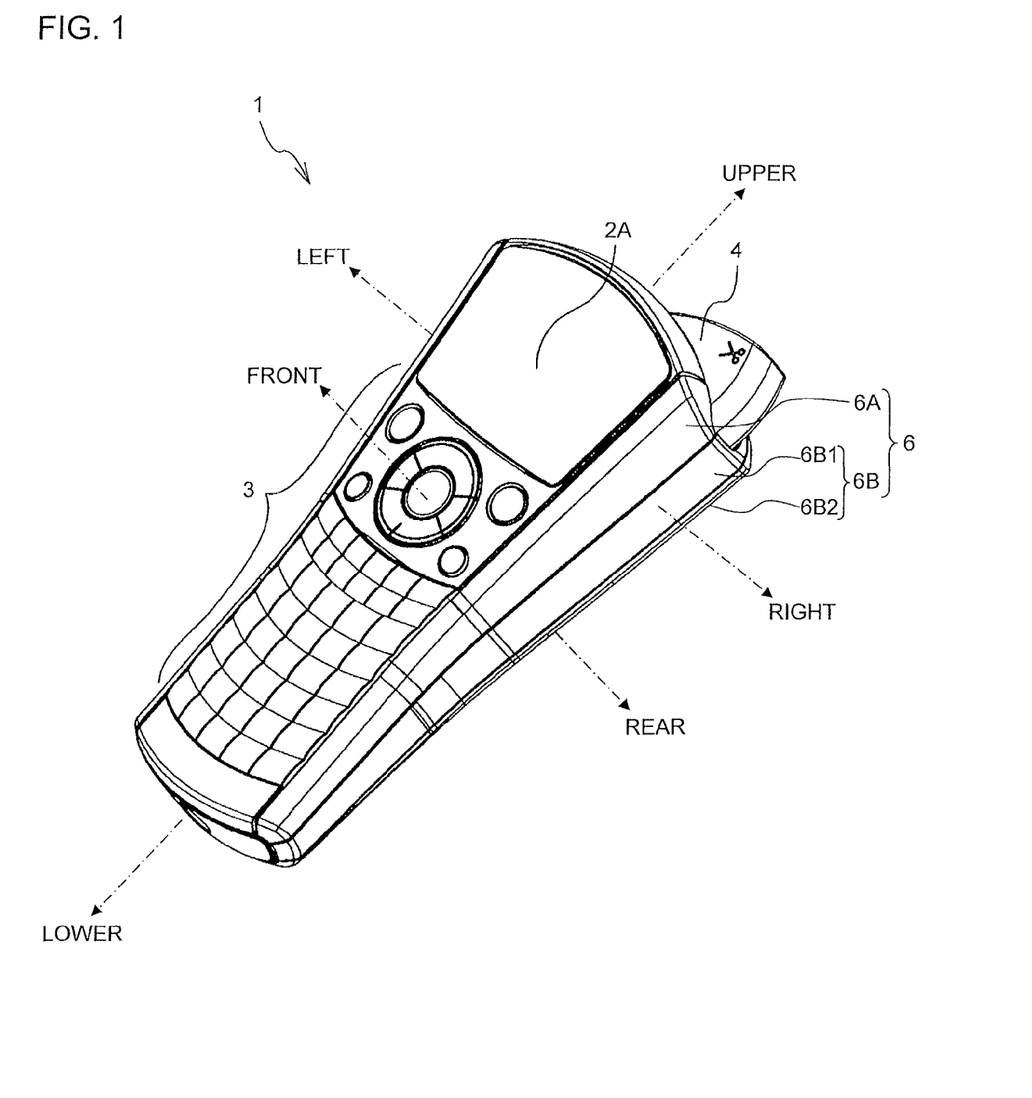
FIG. 1 is a perspective view illustrating an entire configuration of a print label producing device of the present embodiment.

An entire configuration of a print label producing device 1 of the present embodiment will be described by using FIG. 1. As illustrated in FIG. 1, the print label producing device 1 is a handheld type print label producing device gripped by the hand of a user. A housing 6 of this print label producing device 1 includes a front cover 6A constituting a device front surface and a rear cover 6B constituting a device rear surface. Moreover, this rear cover 6B includes a rear cover body 6B1 incorporating various mechanisms and a detachable cover 6B2 capable of being removed from the rear cover body 6B1 when a cartridge 31 or a dry battery 8 is detached/attached.

On an upper side of the above described front cover 6A, a liquid crystal display portion 2 for displaying print data, a setting screen and the like is disposed. A front surface of the liquid crystal display portion 2 is covered by a cover panel 2A which is a transparent acrylic plate or the like, for example, and this cover panel 2A is illustrated in FIG. 1. On a lower side of the liquid crystal display portion 2, a keyboard portion 3 for operating the print label producing device 1 is disposed. This keyboard portion 3 includes character keys of characters, symbols, numerals and the like and various function keys. Moreover, on an upper right end of the above described rear cover body 6B1, a cut button 4 for cutting a label tape 80 with print (see FIG. 4) is disposed.

<Internal Structure of Print Label Producing Device>

Figure 2:
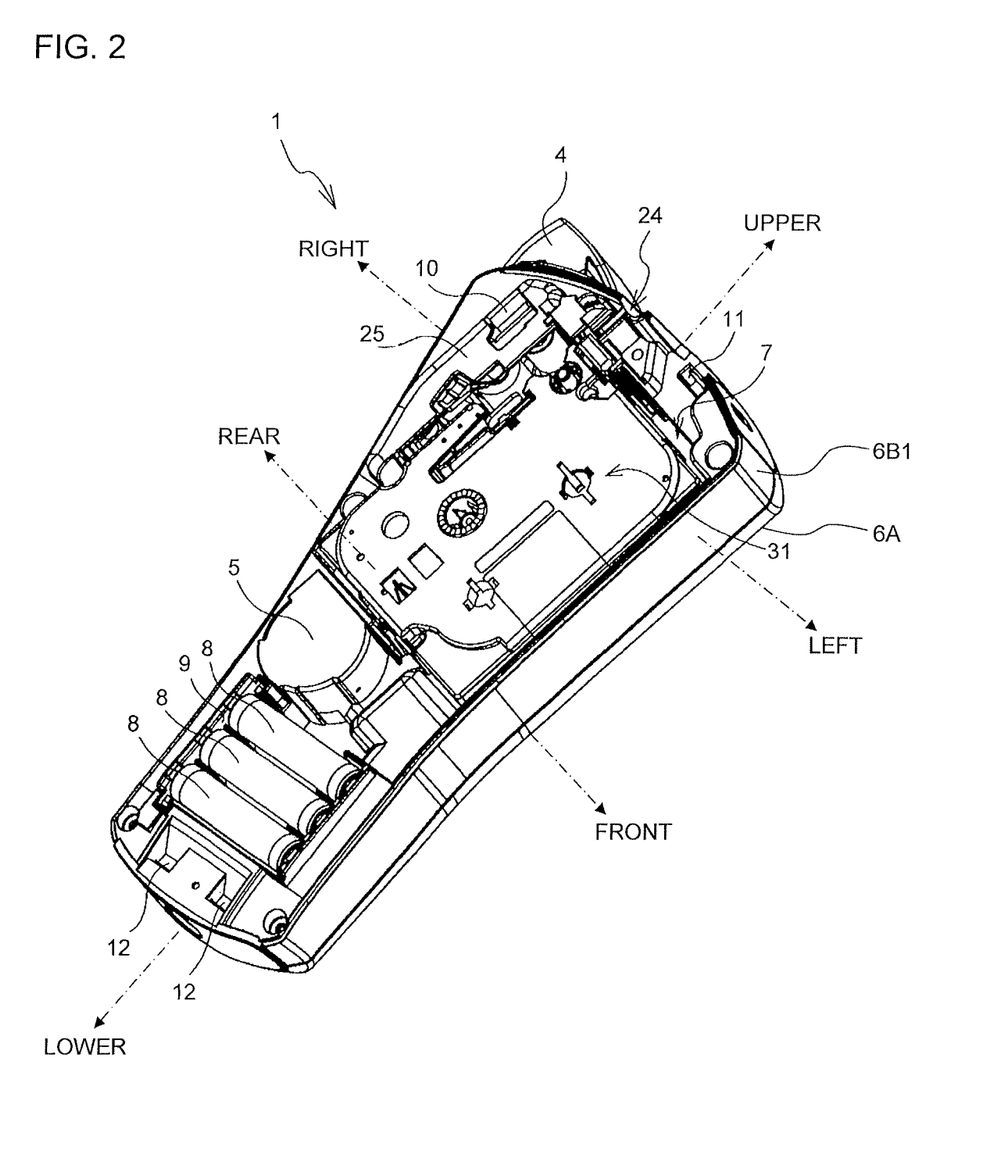
FIG. 2 is a perspective view illustrating an internal structure of the print label producing device in a state in which a detachable cover is removed, and a cartridge is attached to a cartridge holder.

Next, an internal structure of the print label producing device 1 in a state in which the detachable cover 6B2 is removed will be described by using FIGS. 2 and 3. FIG. 2 illustrates a state in which the cartridge 31 is attached to a cartridge holder 7, and FIG. 3 illustrates a state in which the cartridge 31 is removed from the cartridge holder 7.

Figure 3:
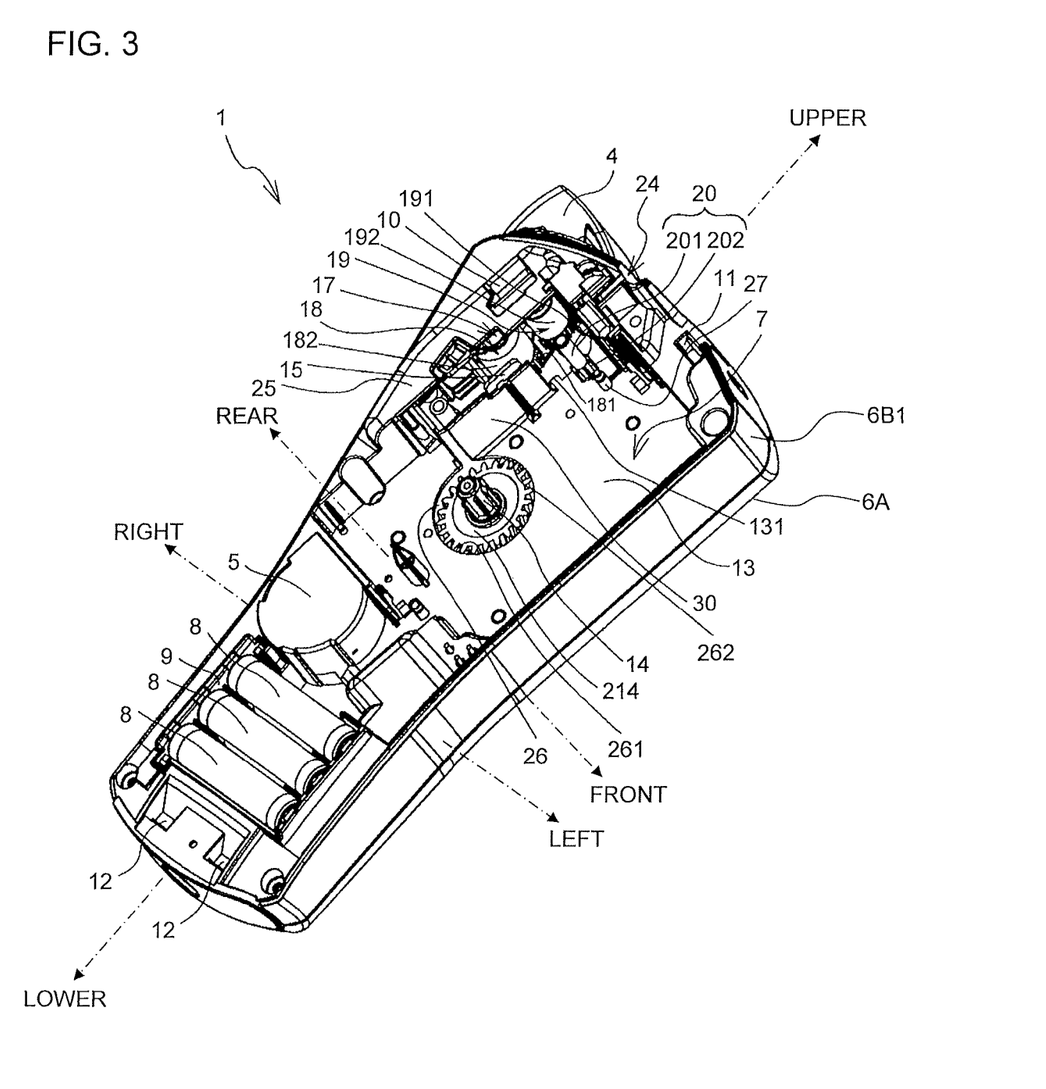
FIG. 3 is a perspective view illustrating the internal structure of the print label producing device in a state in which a detachable cover is removed, and the cartridge is removed from the cartridge holder.

As illustrated in FIGS. 2 and 3, the cartridge holder 7 having a rectangular shape in a planar view formed into a recess shape for attaching/detaching the cartridge 31 is disposed on an upper part on a rear side of the rear cover body 6B1. The cartridge 31 is detached/attached from/to this cartridge holder 7. On a lower side of the cartridge holder 7, a motor container 5 for containing a drive motor 211 (see FIG. 6 which will be described later) is disposed. On a further lower side of the motor container 5, a battery container 9 including a containing space R (see FIG. 5 and the like which will be described later) for containing a dry battery 8 is disposed.

On an upper side of the above described cartridge holder 7, a tape discharging slit 24 for discharging the label tape 80 with print to an outside is disposed. Moreover, on an upper right part of the cartridge holder 7, a roller holder 17 (see also FIG. 4 which will be described later) is disposed, and on a rear side of this roller holder 17, a plate portion 25 having a plate shape is disposed. On an upper part of this plate portion 25, a projecting portion insertion hole 10 which is an opening portion is disposed. When the detachable cover 6B2 is detached/attached from/to the rear cover body 6B1, a projecting portion (not shown) disposed on the detachable cover 6B2 is inserted/removed into/from the above described projecting portion insertion hole 10. As a result, the roller holder 17 can be moved to a printing position (position indicated in FIG. 4 which will be described later) and to a standby position (position indicated in FIGS. 2 and 3).

Moreover, a lock hole 11 is disposed on an upper end portion of the rear cover body 6B1, and a lock hole 12 is disposed to two spots on a lower end portion. When the detachable cover 6B2 is attached to the rear cover body 6B1, a lock member (not shown) disposed on the detachable cover 6B2 is fitted in each of the lock holes 11 and 12. As a result, natural opening of the detachable cover 6B2 is suppressed.

Next, a detailed structure of the cartridge holder 7 will be described. As illustrated in FIG. 3, a bottom surface of the cartridge holder 7 includes a frame 13. A frame end 131 which is a right end portion of the frame 13 is disposed on a further right side of a rib 30 and a roller shaft 20 which will be described later. A recess portion 26 for a gear formed into a recess shape is disposed on a substantially center part of the frame 13. A gear 214 is disposed on the recess portion 26 for a gear. Moreover, on a lower side of the recess portion 26 for a gear, a recess portion first opening 261 for a gear is disposed. The gear 214 is meshed with a plurality of gears (not shown) disposed on a surface on a front side of the frame 13 through the recess portion first opening 261 for a gear. Moreover, a recess portion second opening 262 for a gear is disposed on an upper side of the recess portion 26 for a gear. The gear 214 is meshed with a plurality of gears (not shown) disposed on the surface of the front side of the frame 13 through the recess portion second opening 262 for a gear. On a rear side of the gear 214, a ribbon take-up shaft 14 for taking up an ink ribbon 55 is disposed upright. With this configuration, power of the motor contained in the aforementioned motor container 5 is transmitted to the plurality of gears, and the gear 214 and the ribbon take-up shaft 14 rotate.

FIG. 3 illustrates a state in which a tooth portion of the gear 214 is exposed for explanation, but actually, the tooth portion of the gear 214 has a structure covered by a hiding umbrella portion 114 (see FIG. 5 which will be described later) and not exposed.

Moreover, as illustrated in FIG. 3, the rib 30 is disposed upright on a right side of the ribbon take-up shaft 14. A heat sink 15 which is a rectangular radiator panel is disposed on a right side surface of this rib 30. On a right side surface of the heat sink 15, a thermal head 16 (see FIGS. 4, 5, and 6 which will be described later) having a plurality of heat generating elements is disposed. That is, the heat sink 15 also serves as a support member which supports the thermal head 16.

Moreover, between the rib 30 and the tape discharging slit 24, the roller shaft 20 is disposed upright on the frame 13. The roller shaft 20 includes a columnar portion 201 formed into a columnar shape and six ribs 202 formed radially from an outer periphery of the columnar portion 201 outward (see FIG. 4 which will be described later). The roller shaft 20 is inserted into a shaft hole 391 of a tape feeding roller 39 disposed on the cartridge 31 (see FIG. 4 which will be described later) and rotatably supports the tape feeding roller 39.

On a left side of the roller shaft 20, a projecting portion 27 is disposed upright. This projecting portion 27 positions the cartridge 31 by being inserted into a recess portion (not shown) of the cartridge 31.

<Internal Structure of Cartridge>

An internal structure of the cartridge 31 will be described by using FIG. 4. This FIG. 4 illustrates the roller holder 17 which is a part of the printing mechanism of the print label producing device 1, and the rib 30, the heat sink 15, the thermal head 16 and the like described above, along with the internal structure of the cartridge 31.

Figure 4:
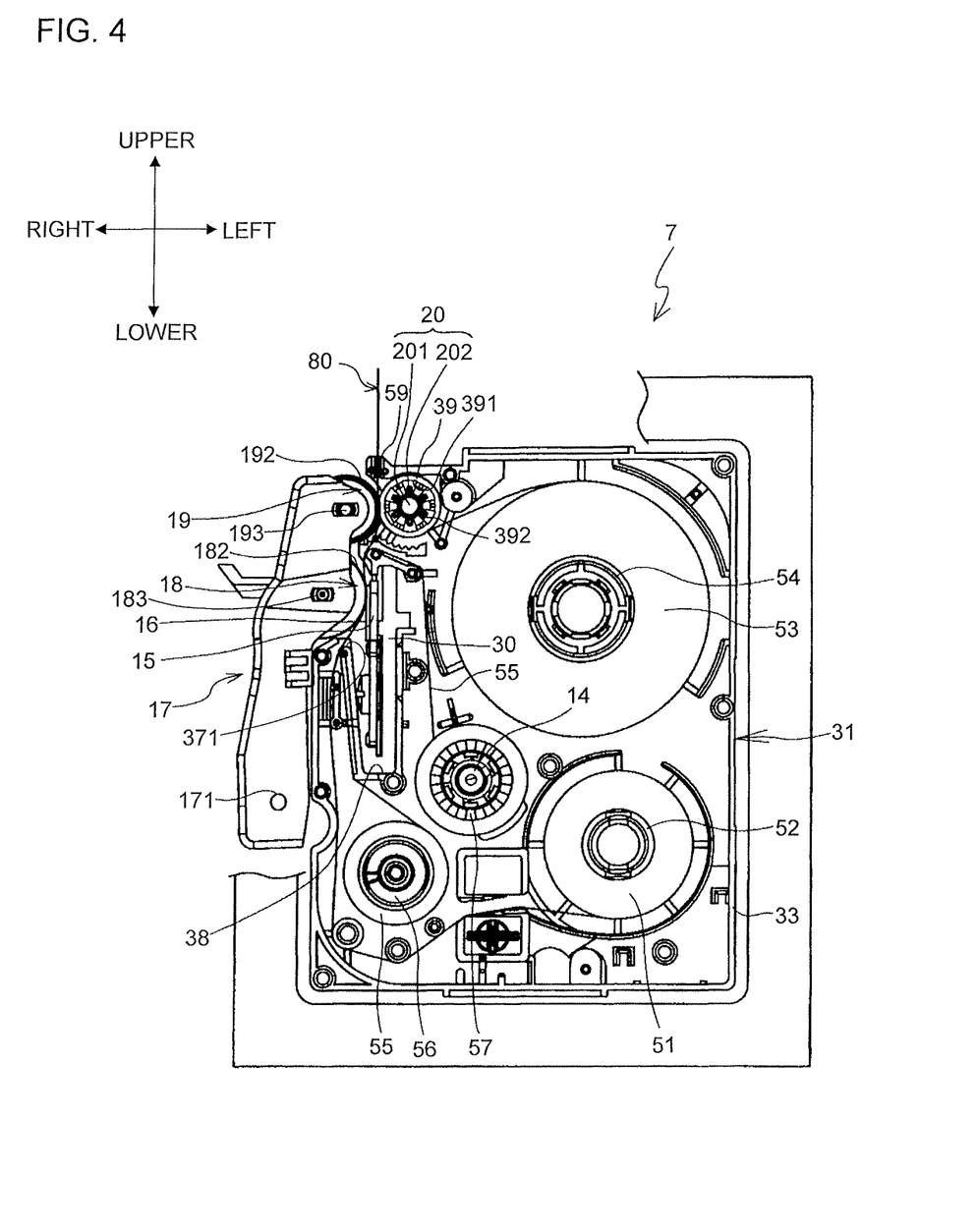
FIG. 4 is a plan view illustrating the internal structure of the cartridge.

As illustrated in FIG. 4, on a lower left part in a cartridge case 33, a cover film spool 52 around which a transparent film-shaped cover film 51 is wound is rotatably arranged. The cover film 51 fed out of this film spool 52 is guided toward a cartridge opening 371 and is sent out from the cartridge opening 371. Moreover, on a lower right part in the cartridge case 33, a ribbon spool 56 around which the ink ribbon 55 is wound is rotatably arranged. The ink ribbon 55 fed out of this ribbon spool 56 is guided toward the cartridge opening 371 and sent out together with the cover film 51.

Between the cover film spool 52 and the ribbon spool 56, a ribbon take-up spool 57 is rotatably arranged. This ribbon take-up spool 57 pulls out the ink ribbon 55 from the ribbon spool 56 and also takes up the ink ribbon 55 consumed by printing of characters and the like.

On an upper part in the cartridge case 33, a base tape spool 54 around which a base tape 53 is wound is rotatably arranged. The base tape 53 fed out of this base tape spool 54 is guided toward the tape feeding roller 39, and the base tape 53 and the cover film 51 with print are pressed into contact by the tape feeding roller 39 and a pressing roller 192 so as to form the label tape 80 with print, which is fed toward a tape discharging exit 59.

Moreover, on a right side of the cartridge 31 attached to the cartridge holder 7, the arm-shaped roller holder 17 including a platen roller unit 18 and a pressing roller unit 19 is disposed capable of swing in a left-and-right direction around a pivot support portion 171. When the detachable cover 6B2 is attached, the roller holder 17 is moved in a direction of the cartridge 31 by the aforementioned projecting portion (not shown). As a result, the pressing roller unit 19 and the platen roller unit 18 disposed on the roller holder 17 are moved to a printing position (position indicated in FIG. 4).

The above described platen roller unit 18 is arranged on a right side of the heat sink 15. In the platen roller unit 18, a platen roller 182 and a platen roller gear (not shown) are disposed. The platen roller 182 is arranged at a position facing the thermal head 16 disposed on the right side surface of the heat sink 15. The platen roller gear is meshed with a gear (not shown) disposed on a front side of the frame 13, and as the platen roller gear to which power is transmitted from the motor rotates, the platen roller 182 rotates. As a result, when the platen roller unit 18 is moved to the printing position, the platen roller 182 feeds the cover film 51 on which characters, figures, symbols and the like are printed toward the pressing roller unit 19 by its rotation while pressing the cover film 51 and the ink ribbon 55 onto the thermal head 16.

In the pressing roller unit 19, a pressing roller 192 and a pressing roller gear 191 (see FIG. 3) are disposed. The pressing roller 192 is arranged at a position facing the roller shaft 20. The pressing roller gear 191 is meshed with the gear (not shown) disposed on the front side of the frame 13, and as the pressing roller gear 191 to which power is transmitted from the motor rotates, the pressing roller 192 rotates. As a result, when the pressing roller unit 19 is moved to the printing position, the pressing roller 192 presses the cover film 51 and the base tape 53 onto the tape feeding roller 39 rotatably supported by the roller shaft 20. As a result, the cover film 51 on which printing is made and the base tape 53 are pressed into contact so as to form the label tape 80 with print, which is discharged to the outside of the print label producing device 1 from the tape discharging slit 24.

Figure 5:
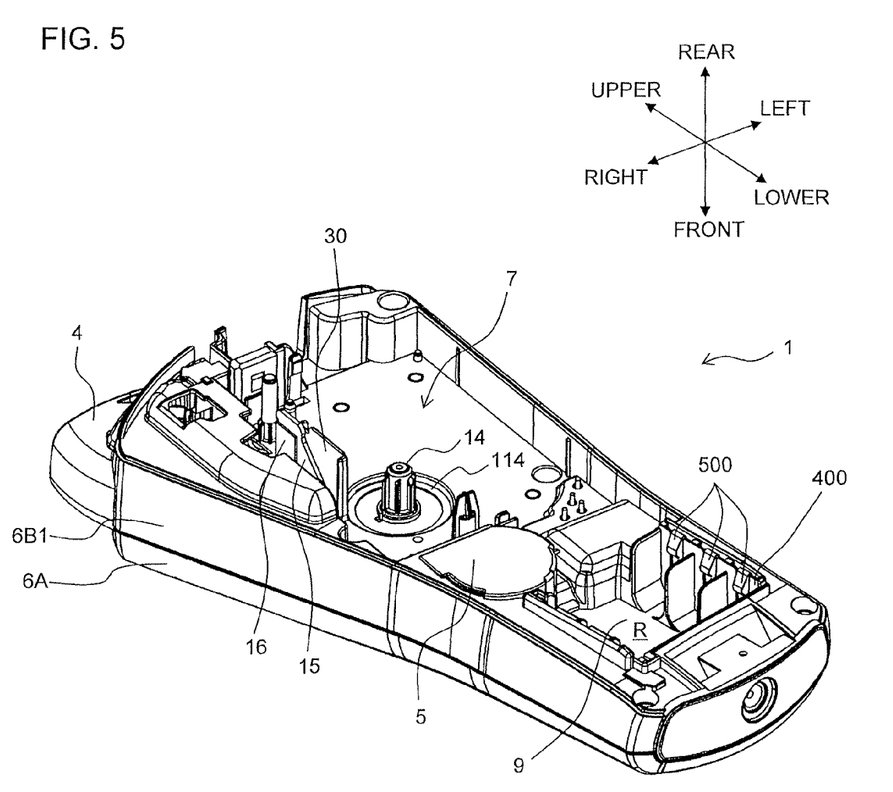
FIG. 5 is a perspective view illustrating the internal structure of the print label producing device in a state in which the detachable cover is removed, and the cartridge is removed from the cartridge holder.

FIG. 5 is a perspective view illustrating an appearance of the print label producing device 1 in a state in which the detachable cover 6B2 is removed. FIG. 5 is a diagram having the substantially same contents as those of the aforementioned FIG. 3 with only a seeing direction changed and illustrates a plate spring member 500 disposed on a side wall 400 of the above described battery container 9. The battery container 9 includes the side wall 400 disposed vertically upright while facing the positive electrode or the negative electrode of the dry battery 8 to be contained, and the plate spring member 500 elastically urging the dry battery 8 contained in the battery container 9 is disposed on this side wall 400. In the present embodiment, by using the plate spring for urging the contained dry battery 8 as described above, it is possible to avoid increase in the contact resistance (electric conduction resistance) as in the case of using a spiral coil spring.

<Control System>

Subsequently, a control system of the print label producing device 1 will be described by using FIG. 6. Arrows indicated in FIG. 6 illustrate an example of flows of signals and are not intended to limit a flow direction of the signals.

Figure 6:
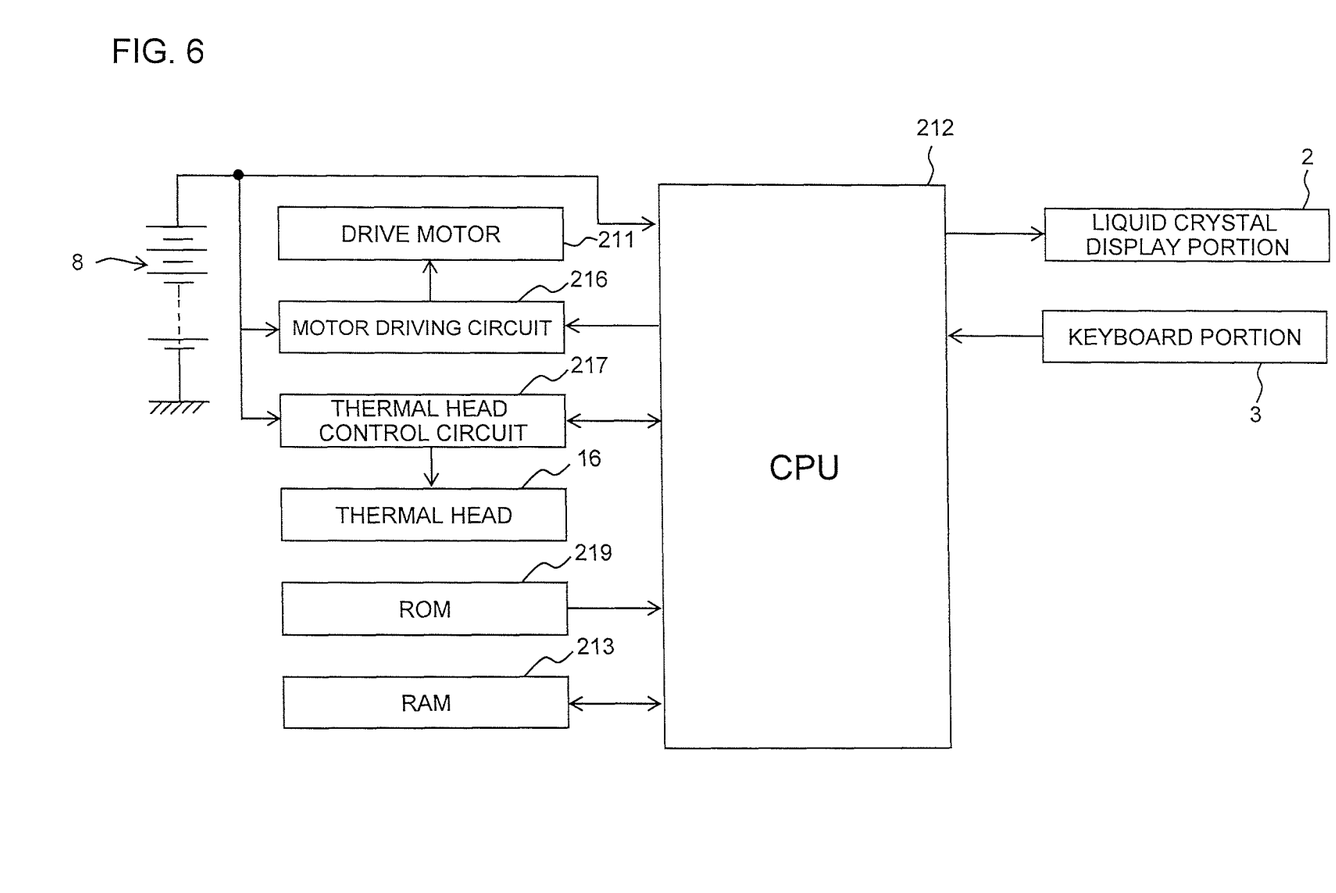
FIG. 6 is a functional block diagram illustrating a control system of the print label producing device.

In FIG. 6, the print label producing device 1 has a CPU 212 constituting a calculation portion which executes a predetermined calculation.

The CPU 212 executes signal processing in accordance with a program stored in an ROM 219 in advance while using a temporary storing function of an RAM 213, whereby the entire print label producing device 1 is controlled.

Moreover, the CPU 212 is connected to a motor driving circuit 216 which executes driving control of the drive motor 211 for driving the above described platen roller 182 and a thermal head control circuit 217 which executes conduction control of the plurality of heat generating elements of the above described thermal head 16.

A positive electrode side of the above described dry battery 8 is connected to the CPU 212, the motor driving circuit 216, and the thermal head control circuit 217, while a negative electrode side is grounded.

Moreover, the liquid crystal display portion 2, the ROM 219, the RAM 213, and the keyboard portion 3 described above are connected to the CPU 212. The ROM 219 stores a control program for executing various types of processing.

<Structure of Plate Spring Member and Side Wall of Battery Container>

In the print label producing device 1 having a basic configuration as above, the most distinctive feature of the present embodiment is a structure in the battery container 9. The details will be described below by referring to FIGS. 7 to 10. For convenience of explanation, in FIGS. 7 to 10, the terms "upper", "lower", "left", "right" and the like are assumed to refer to the respective directions in FIGS. 7 to 10 unlike the directions indicated in FIGS. 1 to 5.

In the present embodiment, electric power is supplied to the CPU 212, the motor driving circuit 216, the thermal head control circuit 217 and the like by the dry battery 8 contained in the battery container 9. The plate spring member 500 is disposed on the side wall 400 of the battery container 9.

Figure 7:
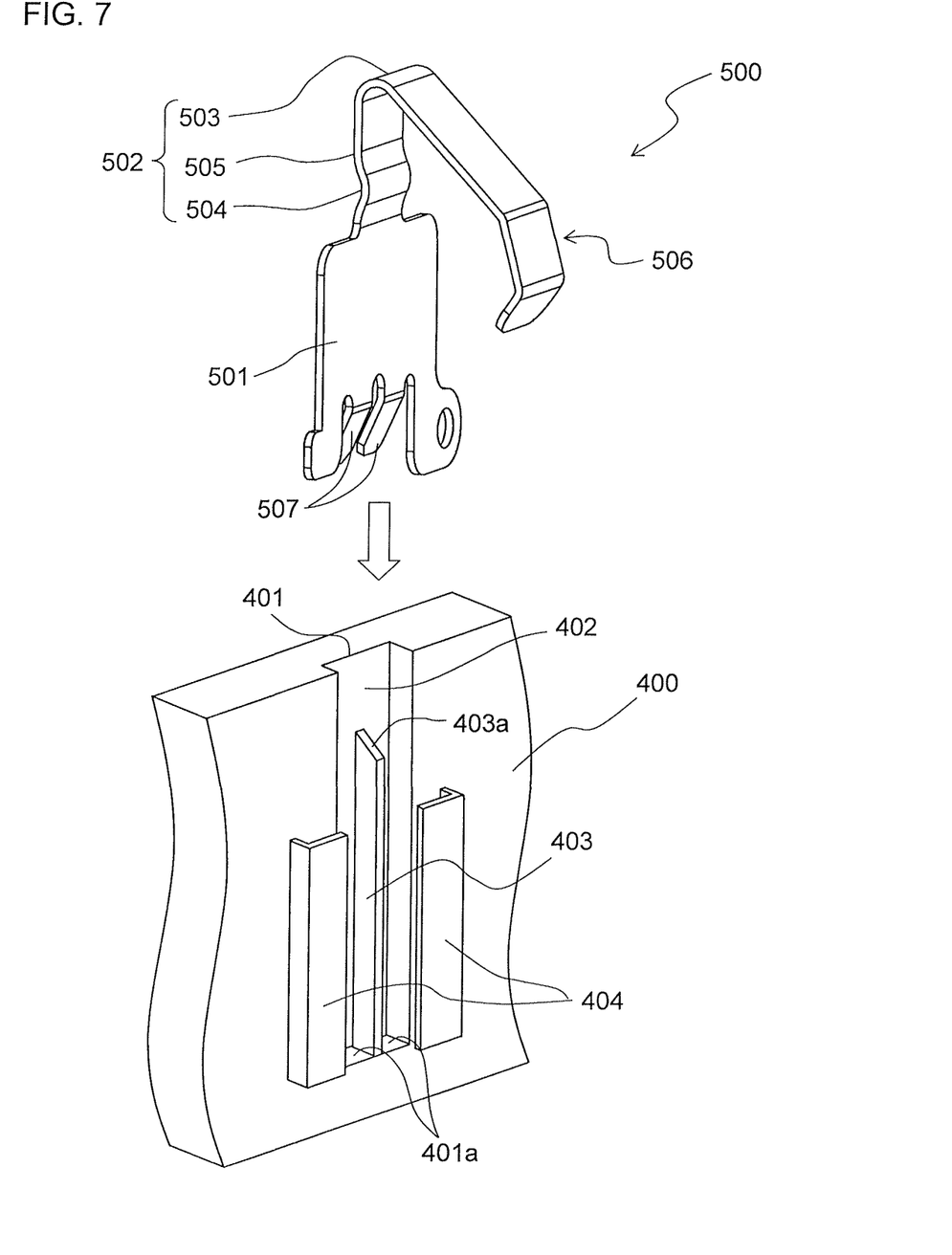
FIG. 7 is a perspective view illustrating a detailed structure of a side wall of a battery container and a plate spring member.

As illustrated in FIG. 7, the plate spring member 500 includes a base portion 501 having a flat plate shape mounted on the side wall 400, a first claw portion 506 brought into contact with the positive electrode or the negative electrode of the dry battery 8 contained in the battery container 9, and a connection portion 502 connecting the base portion 501 and the first claw portion 506 while bending.

The first claw portion 506 has a shape bent at two spots toward the side wall 400 side (the side opposite to the dry battery 8) or in other words, a substantially L-shape projecting to the above described containing space R side. When the dry battery 8 is contained in the battery container 9, the first claw portion 506 of the plate spring member 500 is brought into contact with the positive electrode or the negative electrode of the dry battery 8. As a result, the plate spring member 500 elastically urges the positive electrode or the negative electrode of the dry battery 8, and electric conduction is realized from the dry battery 8 to the plate spring member 500.

The above described connection portion 502 has a first bent portion 503, a substantially Ω-Shaped second bent portion 504, and an intermediate portion 505 disposed between the first bent portion 503 and the second bent portion 504.

The second bent portion 504 is extended upward from an upper end of the base portion 501 and has a projecting portion projecting in a substantially arc shape toward the dry battery 8 side (in other words, the containing space R side).

The intermediate portion 505 is disposed on an upper side (that is, on the side opposite to the base portion 501) of the above described second bent portion 504, and a surface on the dry battery side can be brought into contact with a rib 403 (which will be described later) disposed on the side wall 400 during elastic deformation of the plate spring member 500.

The first bent portion 503 is disposed on an upper side (that is, the side opposite to the base portion 501) of the above described intermediate portion 505 and has a shape folded back (that is, bent toward the dry battery 8 side) so as to connect the base portion 501 and the first claw portion 506 in an inverted V-shape. The first bent portion 503 plays a role with such a shape of having the first claw portion 506 facing the positive electrode or the negative electrode in a state in which the dry battery 8 is contained in the battery container 9.

In other words, the above described first bent portion 503 and intermediate portion 505 constitute a portion bent in the inverted V-shape from the upper side of the above described second bent portion 504 and extending to the above described containing space R side, and the first claw portion 506 is disposed on its tip end side.

To a center on a lower end of the base portion 501, a bifurcated second claw portion 507 inclined toward the side wall 400 side and bent is disposed. This second claw portion 507 is brought into contact with a bottom portion 401a of an undercut 401 of the side wall 400 so that the plate spring member 500 is positioned with respect to the side wall 400. The plate spring member 500 includes a stainless material, for example, having corrosion resistance and high conductivity.

On the other hand, on the side wall 400, a pair of left and right holding frame portions 404 each having a substantially L-shape in a planar view for inserting and holding both left and right end sides of the base portion 501 of the plate spring member 500 are attached, and the undercut 401 which has a substantially rectangular shape in a planar view and is vertically long is formed between the both holding frame portions 404. Moreover, a rib 403 is projected along a longitudinal direction at a center of the undercut 401. An upper end of this rib 403 forms an inclined surface 403a inclined by a predetermined angle with respect to a height direction of the rib.

As illustrated in FIG. 7, the plate spring member 500 is attached to the side wall 400 by inserting the both left and right ends of the base portion 501 into the pair of left and right holding frame portions 404, respectively. At this time, they are inserted into the holding frame portions 404 while the rib 403 is inserted into a gap between the bifurcated second claw portions 507, and the second claw portions 507 are brought into contact with and held by the bottom portion 401a of the undercut 401. Moreover, the above described inclined surface 403a which is an upper end of this rib 403 is located below a groove upper end of the undercut 401. As a result, an upper side of the rib 403 of the undercut 401 serves as a receiving portion 402 capable of being brought into contact with the above described first bent portion 503 or its vicinity and receiving it during elastic deformation of the plate spring member 500. That is, during elastic deformation of the plate spring member 500, a surface on the side opposite to the battery (the side opposite to the dry battery 8) of the intermediate portion 505 between the first bent portion 503 and the second bent portion 504 in the above described connection portion 502 is brought into contact with the inclined surface 403a of the rib 403, and subsequently, the above described receiving portion 402 is brought into contact with the first bent portion 503 or its vicinity so that the plate spring member 500 can be received.

<Shape Change of Plate Spring Member>

Subsequently, details of a shape change of the plate spring member 500 during attachment of the dry battery 8 to the battery container 9 will be described by referring to FIGS. 8A to 8E.

Figure 8A:
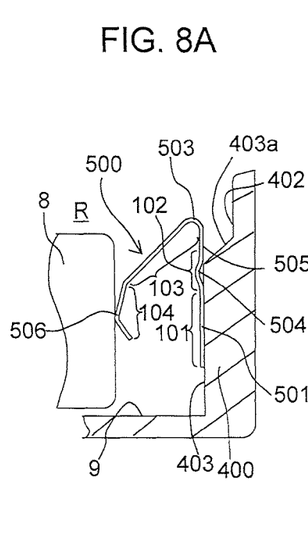
FIG. 8A is an explanatory diagram for explaining a shape change of the plate spring member.

As illustrated in FIG. 8A, when the dry battery 8 is contained in the battery container 9, the first claw portion 506 of the plate spring member 500 is brought into contact with the electrode (the positive electrode or the negative electrode) of the dry battery 8.

Figure 8B:
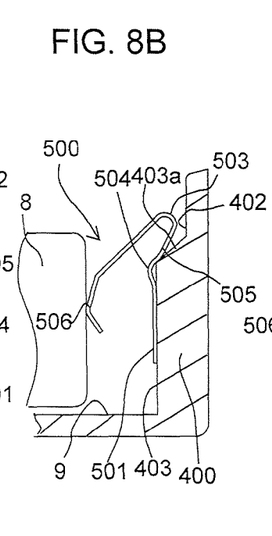
FIG. 8B is an explanatory diagram for explaining a shape change of the plate spring member.

In this state, if the plate spring member 500 receives an impact or a force for some reason from the dry battery 8 side to the side wall 400 side, as illustrated in FIG. 8B, both the first bent portion 503 and the second bent portion 504 of the plate spring member 500 are elastically bent/deformed, whereby the first claw portion 506 is displaced to the base portion 501 side through the both bent portions 503 and 504. At this time, by means of bending/deformation of the second bent portion 504, the first bent portion 503 and its vicinity of the plate spring member 500 enters the undercut 401. As a result, the surface on the side opposite to the battery of the intermediate portion 505 is brought into contact with the inclined surface 403a on the upper end of the rib 403, and further deformation in the vicinity of the intermediate portion 505 can be suppressed.

Figure 8C:
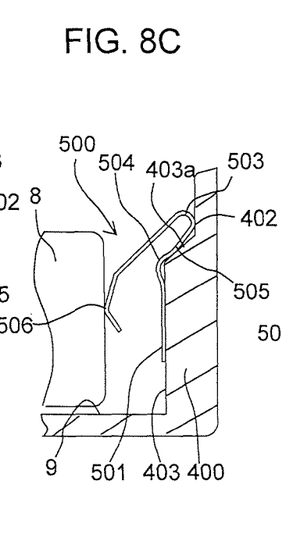
FIG. 8C is an explanatory diagram for explaining a shape change of the plate spring member.

If the plate spring member 500 further receives a force from the dry battery 8 side, as illustrated in FIG. 8C, the first bent portion 503 or its vicinity is brought into contact with and received by a receiving portion 402 in the undercut 401. As a result, further bending/deformation of the second bent portion 504 is prevented (in other words, the bending/deformation of the second bent portion 504 is kept within a range of the elastic deformation), and occurrence of plastic deformation in the second bent portion 504 can be suppressed.

Figure 8D:
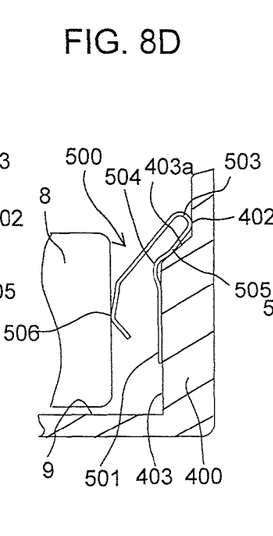
FIG. 8D is an explanatory diagram for explaining a shape change of the plate spring member.
Figure 8E:
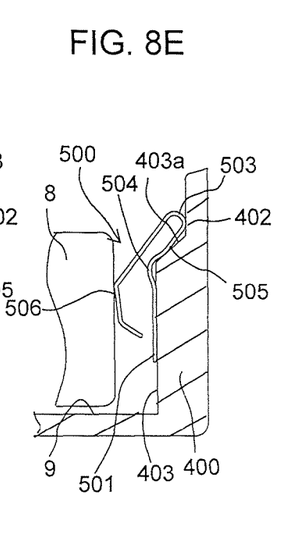
FIG. 8E is an explanatory diagram for explaining a shape change of the plate spring member.
Figure 9A:
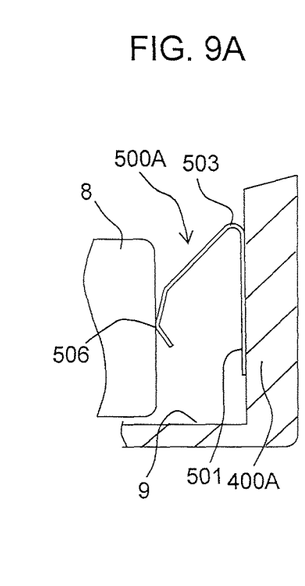
FIG. 9A is an explanatory diagram for explaining a shape change of the plate spring member in a comparative example 1.
Figure 9B:
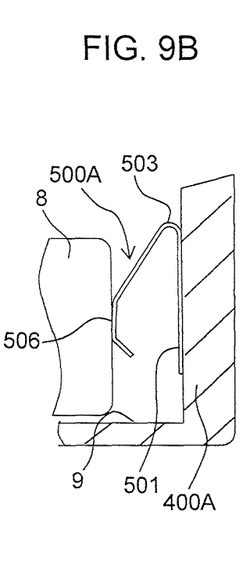
FIG. 9B is an explanatory diagram for explaining a shape change of the plate spring member in a comparative example 1.
Figure 9C:
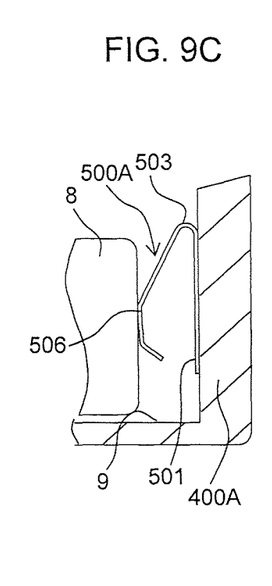
FIG. 9C is an explanatory diagram for explaining a shape change of the plate spring member in a comparative example 1.
Figure 9D:
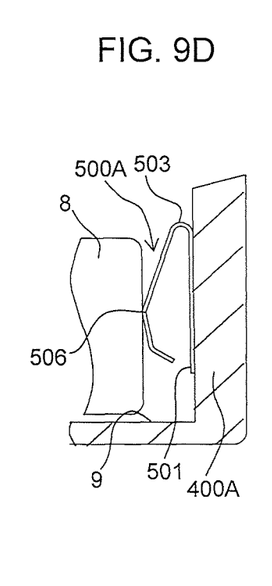
FIG. 9D is an explanatory diagram for explaining a shape change of the plate spring member in a comparative example 1.
Figure 9E:
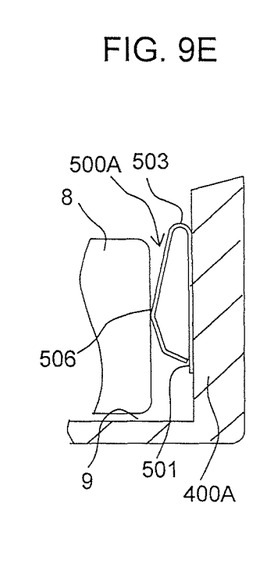
FIG. 9E is an explanatory diagram for explaining a shape change of the plate spring member in a comparative example 1.
Figure 10A:
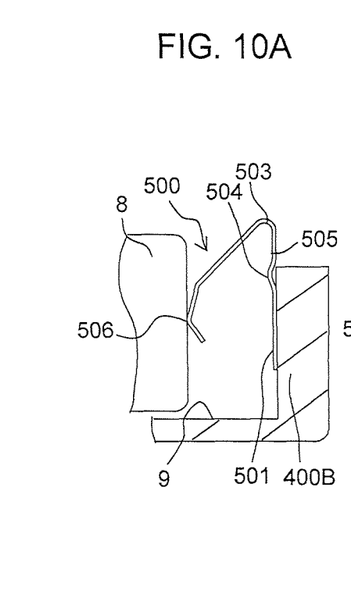
FIG. 10A is an explanatory diagram for explaining a shape change of the plate spring member in a comparative example 2.
Figure 10B:
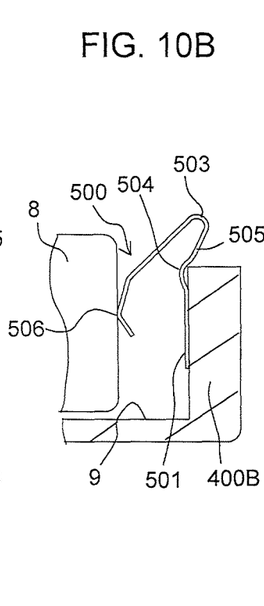
FIG. 10B is an explanatory diagram for explaining a shape change of the plate spring member in a comparative example 2.
Figure 10C:
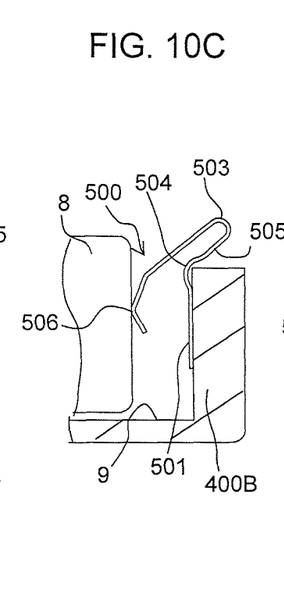
FIG. 10C is an explanatory diagram for explaining a shape change of the plate spring member in a comparative example 2.
Figure 10D:
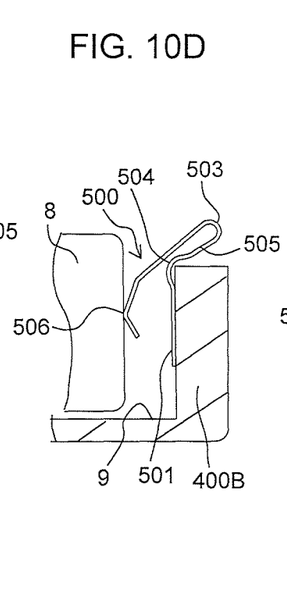
FIG. 10D is an explanatory diagram for explaining a shape change of the plate spring member in a comparative example 2.
Figure 10E:
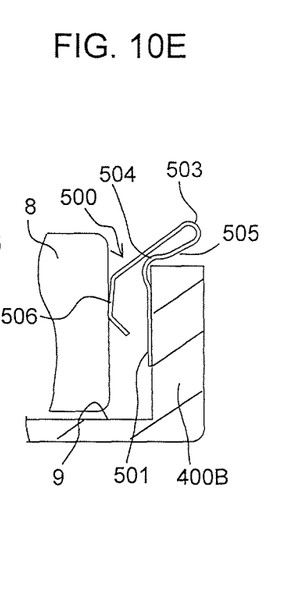
FIG. 10E is an explanatory diagram for explaining a shape change of the plate spring member in a comparative example 2.

If the plate spring member 500 further receives a force from the dry battery 8 side from this state, as illustrated in FIGS. 8D and 8E, only the first bent portion 503 is further bent/deformed. At this time, the bending/deformation of the second bent portion 504 is maintained, and further deformation is prevented from occurring. As described above, when the plate spring member 500 is to be largely displaced to the side opposite to the battery by the force from the dry battery 8 side, stress applied in the course of the displacement is distributed and borne by the above described two bent portions 503 and 504. As a result, the stress applied to one bent portion is reduced, and plastic deformation of the plate spring member 500 can be suppressed.

<Effects of the Present Embodiment>

The effects of the present embodiment described above will be explained by referring to two comparative examples. FIGS. 9A to 9E illustrate a shape change of the plate spring member in the comparative example 1. In FIGS. 9A to 9E, a side wall 400A is a flush side wall without the undercut 401, and a plate spring member 500A is a plate spring member not having the second bent portion 504 but having only the first bent portion 503.

In the case of the comparative example 1, as illustrated in FIGS. 9A to 9E, if the plate spring member 500 receives a force from the dry battery 8 side, the first bent portion 503 is gradually bent/deformed, and the first claw portion 506 is displaced to the base portion 501 side only through this first bent portion 503. Thus, the stress applied by the above described impact concentrates only on the first bent portion 503, and the first bent portion 503 might be plastically deformed.

FIGS. 10A to 10E illustrate a shape change of a plate spring member in a comparative example 2. In FIGS. 10A to 10E, a side wall 400B is a side wall which has an undercut formed but does not have the receiving portion 402 or the rib 403. The plate spring member 500 is the same as in the above described embodiment.

In the case of the comparative example 2, as illustrated in FIGS. 10A to 10E, if a force is received from the dry battery 8 side, both the first bent portion 503 and the second bent portion 504 of the plate spring member 500 are bent/deformed, whereby the first claw portion 506 is displaced to the base portion 501 side through the both bent portions 503 and 504. At this time, since the side wall portion 400B does not have the receiving portion 402, the first bent portion 503 of the plate spring member 500 is not received. Thus, the second bent portion 504 is continuously bent/deformed, and the bending/deformation of the second bent portion 504 cannot be suppressed. As a result, the stress applied on the plate spring member 500 by the force from the dry battery 8 side concentrates on the second bent portion 504, and the second bent portion 504 might be plastically deformed.

On the other hand, in the present embodiment, if the plate spring member 500 is to be largely displaced to the side opposite to the battery by occurrence of an impact or the like, the stress applied by the force from the dry battery 8 side in the course of the displacement is distributed and borne by the two bent portions, that is, the first bent portion 503 and the second bent portion 504. As a result, the stress applied on one bent portion can be reduced, and plastic deformation can be suppressed.

Moreover, at this time, the first bent portion 503 of the plate spring member 500 is bent to the one side (dry battery 8 side) so that the first claw portion 506 faces the positive electrode or the negative electrode of the dry battery 8 in a state in which the dry battery 8 is contained. On the other hand, the second bent portion 504 is bent to the other side (side wall 400 side) opposite to the above described first bent portion 503. As a result, since the two bent portions 503 and 504 have bending directions opposite to each other, displacement of the entire plate spring member 500 including those two bent portions is suppressed, whereby occurrence of plastic deformation in the plate spring member 500 can be suppressed, too.

Moreover, during elastic deformation of the plate spring member 500, the rib 403 of the side wall 400 is brought into contact with the intermediate portion 505 located between the two bent portions, and further deformation in the vicinity of the intermediate portion 505 is suppressed. As a result, occurrence of plastic deformation in the plate spring member 500 can be reliably suppressed.

Moreover, during elastic deformation of the plate spring member 500, after the inclined surface 403a of the rib 403 is brought into contact with the intermediate portion 505 located between the two bent portions 503 and 504, the receiving portion 402 of the side wall 400 is further brought into contact with the first bent portion 503 (or its vicinity), and further deformation of the second bent portion 504 (or its vicinity) is suppressed. As a result, occurrence of plastic deformation in the plate spring member 500 can be suppressed further reliably.

As the result of the above, in the present embodiment, by using the plate spring member 500 for the battery terminal (instead of a coil spring), it is possible to suppress plastic deformation of the plate spring member 500 while avoiding increase in the contact resistance.

Moreover, particularly in the present embodiment, the plate spring member 500 includes a stainless material. Since the stainless material can be plastically deformed particularly more easily than the other members, an effect of suppressing the plastic deformation of this embodiment is particularly effective. Moreover, since the stainless material is resistant against corrosion, even if liquid leakage occurs in the dry battery 8, corrosion in the plate spring member 500 can be suppressed.

Moreover, particularly in the present embodiment, an electronic device configured such that plastic deformation of the plate spring member 500 which is a battery terminal is suppressed is the print label producing device 1 in which the heat generating element of the conducted thermal head 16 forms a print on the cover film 51 being fed. As a result, in the battery container 9 used in the print label producing device 1, by using the plate spring member 500 while suppressing plastic deformation, it is possible to avoid increase in contact resistance, and even during print operation requiring a large current, it is possible to suppress a voltage loss caused by contact resistance. That is, in the print label producing device 1 requiring a considerably large current when the plurality of heat generating elements are energized, use of the plate spring member 500 having the above described configuration is extremely effective. It is as a matter of course that the configuration of the present embodiment can be applied to the other various electronic devices other than the print label producing device 1.

<Modification>

The present disclosure is not limited to the above described embodiment and is capable of various variations within a range not departing from the gist and technical idea thereof.

Figure 11A:
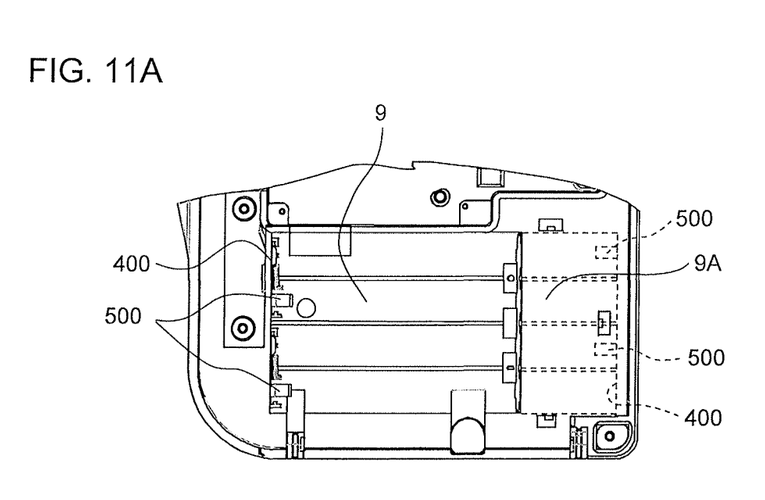
FIG. 11A is a plan view illustrating a state in which the dry battery is removed from the battery container in a modification in which the plate spring member is covered.
Figure 11B:
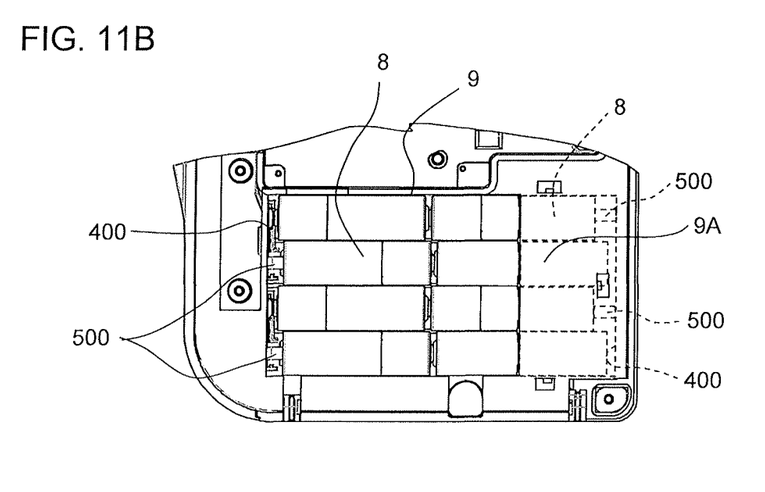
FIG. 11B is a plan view illustrating a state in which the dry battery is attached to the battery container in the modification in which the plate spring member is covered.

For example, as illustrated in FIG. 11A, the plate spring member 500 on one side in a left-and-right direction may be covered by a wall surface 9A covering one side in the left-and-right direction of the battery container 9. In this case, as illustrated in FIG. 11B, if the plate spring member 500 covered by the wall surface 9A is plastically deformed by an impact or the like from the dry battery 8 side in a state in which the dry battery 8 is contained in the battery container 9, it is difficult to adjust this by adding a force from the outside. Therefore, if it is difficult to apply an external force to the plate spring member 500 as above, to apply the structure of the plate spring member 500 and the side wall 400 which can suppress plastic deformation as described above is particularly effective.

Moreover, other than those described above, the above described embodiment or methods by the variations may be combined as appropriate in use.

What is claimed is:

1. An electronic device comprising:
a battery container configured to contain a dry battery that supplies electric power;
a side wall provided in said battery container and configured to be disposed upright along a first direction orthogonal to an axis of said dry battery while facing a positive electrode or a negative electrode of said dry battery; and
a plate spring member that is disposed on said side wall and configured to elastically urge said dry battery contained in said battery container and is configured so as to elastically deform along with increase of a load and to further plastically deform thereafter;
said plate spring member comprising:
a base portion mounted on said side wall;
a contact portion configured to be in contact with said positive electrode or said negative electrode of said dry battery contained in said battery container; and
a connection portion that connects said base portion and said contact portion while bending;
said connection portion comprising:
a first bent portion that is bent so as to connect said base portion and said contact portion in an inverted V-shape in a state in which said dry battery is contained in said battery container; and
a second bent portion that is disposed on the base portion side further than said first bent portion and comprises a projecting portion configured to project to the dry battery side in a state in which said dry battery is contained in said battery container; and
an intermediate portion that is disposed between said first bent portion and said second bent portion,
said side wall comprising:
an undercut that has a concave shape; and
a rib that extends along said first direction in said undercut;
said rib comprising an inclined surface that is disposed at an end portion on one side of said first direction, and is configured to be contact with a surface of said intermediate portion on a side opposite to the dry battery during said elastic deformation before said plate spring member undersgoes said plastic deformation,
said undercut comprising a receiving portion disposed further on the one side of said first direction than said inclined surface, the receiving portion being configured to be into contact with and receive said first bent portion or its vicinity after said inclined surface is brought into contact with said surface of said intermediate portion on the side opposite to the dry battery during said elastic deformation of said plate spring member.

2. The electronic device according to claim 1, wherein:
said plate spring member is made of stainless.

3. The electronic device according to claim 1, further comprising:
a feeder configured to feed a material to be printed;
a printing head comprising a plurality of heat generating elements;
an energizing device configured to energize said plurality of heat generating elements of said printing head in accordance with print data; and
a driving device configured to control driving of said feeder, wherein
said battery container is configured to contain said dry battery that supplies electric power to said energizing device and said driving device.

4. An electronic device comprising:
a housing;
a container that is disposed in the housing;
a side wall included in said container; and
a plate spring member that is disposed on said side wall and is configured so as to elastically deform along with increase of a load and to further plastically deform thereafter;
said plate spring member comprising:
a flat plate portion mounted on said side wall;
a curved portion having a substantially Ω shape that is disposed to one side of said flat plate portion and comprises a projecting portion projecting on the containing space side;
a bent portion that extends from said one side of said curved portion in an inverted V-shape while bending; and
a claw portion disposed to a tip end side of said bent portion, the tip end side being the containing space side said claw portion has a substantially L-shape projecting to the containing space side,
said side wall comprising:
an undercut that has a concave shape; and
a rib that extends along a direction connecting the one side and the other side opposite the one side in said undercut;
said rib comprising an inclined surface that is disposed at an end portion on the one side, and is configured to be contact with a surface of said curved portion on a side opposite to the projecting side during said elastic deformation before said plate spring member undergoes said plastic deformation,
said undercut comprising a receiving portion disposed further on the one side than said inclined surface, the receiving portion being configured to be into contact with and receive said bent portion or its vicinity after said inclined surface is brought into contact with said surface of said curved portion on the side opposite to the projecting side during said elastic deformation of said plate spring member.

5. The electronic device according to claim 4, wherein:
said claw portion has a substantially L-shape into said container.

* * * * *